United States Patent [19]

Ikeda

[11] Patent Number: 5,636,212
[45] Date of Patent: Jun. 3, 1997

[54] BURST BANDWIDTH RESERVATION METHOD IN ASYNCHRONOUS TRANSFER MODE (ATM) NETWORK

[75] Inventor: Chinatsu Ikeda, Tokyo, Japan

[73] Assignee: NEC Corporation, Tokyo, Japan

[21] Appl. No.: 182,421

[22] Filed: Jan. 5, 1994

[30] Foreign Application Priority Data

| Jan. 6, 1993 | [JP] | Japan | 5-000451 |
| May 31, 1993 | [JP] | Japan | 5-128554 |
| May 28, 1993 | [JP] | Japan | 5-126529 |

[51] Int. Cl.⁶ .................................................. H04J 3/22
[52] U.S. Cl. ...................... 370/233; 370/236; 370/397; 370/468
[58] Field of Search ........................... 370/84, 94.1, 60, 370/60.1, 94.2, 85.1, 85.2, 85.3

[56] References Cited

U.S. PATENT DOCUMENTS

| 4,641,307 | 2/1987 | Russell | 370/94.1 |
| 5,179,556 | 1/1993 | Turner | 370/94.1 |
| 5,280,470 | 1/1994 | Buhrke et al. | 370/94.2 |
| 5,280,483 | 1/1994 | Kamoi et al. | 370/84 |
| 5,313,467 | 5/1994 | Varghese et al. | 370/84 |
| 5,315,586 | 5/1994 | Charvillat | 370/94.1 |
| 5,349,580 | 9/1994 | Hester et al. | 370/84 |
| 5,357,510 | 10/1994 | Norizuki et al. | 370/94.1 |

FOREIGN PATENT DOCUMENTS

| 0446956 | 9/1991 | European Pat. Off. . |
| 0448073 | 9/1991 | European Pat. Off. . |

OTHER PUBLICATIONS

IEEE International Conference on Communications: vol. 2 of 4, 15 Apr. 1990, Atlanta pp. 439–442 XP000169724 Wang et al. 'Bandwidth Allocation for ATM Networks' *p. 440, left column, line 34—right column, line 42*.

*Primary Examiner*—Douglas W. Olms
*Assistant Examiner*—Shick Hom
*Attorney, Agent, or Firm*—Popham, Haik, Schnobrich & Kaufman. Ltd.

[57] ABSTRACT

In an ATM network using a burst-level band-width allocation, a source terminal reserves, before a burst transmission, band-widths according to a peak rate of the burst and then sends the burst therethrough. When the transmission is finished, the band-widths are released. Where there exists a link to which the peak rate is not assigned, a non-reserving acknowledgement signal (NACK) is sent to the terminal and the reserved band-widths are released. On receiving the NACK, the terminal allocates a band-width with peak rate lower than that of the first request after a back-off time has elapsed, thereby minimizing the probability of a blocked transmission. The source terminal declares a minimum band-width together with the peak rate (maximum band-width) in the band-width request operation. Each node allocates the peak rate when the remaining band-width of a link controlled by the node is sufficient to allocate the peak rate. Even if the remaining band-width is insufficient, when the band-width is not less than the minimum band-width, there is allocated a band-width equal to or more than the minimum band-width and equal to or less than the peak rate according to the remaining band-width, thereby transferring the burst.

17 Claims, 11 Drawing Sheets

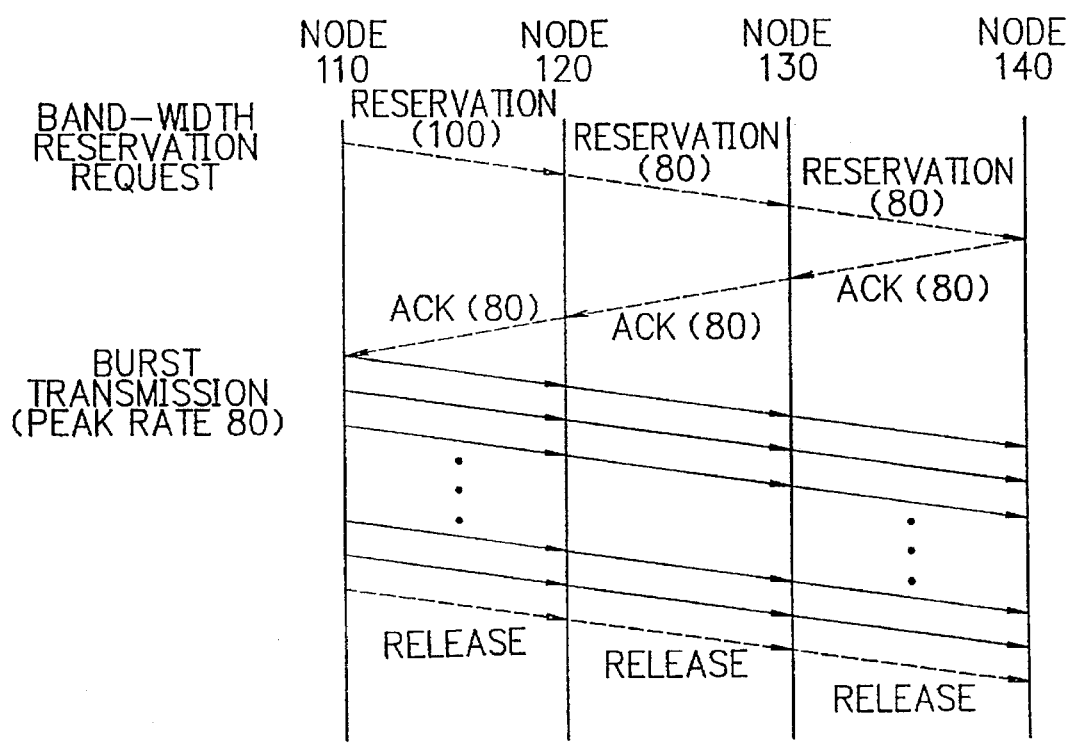
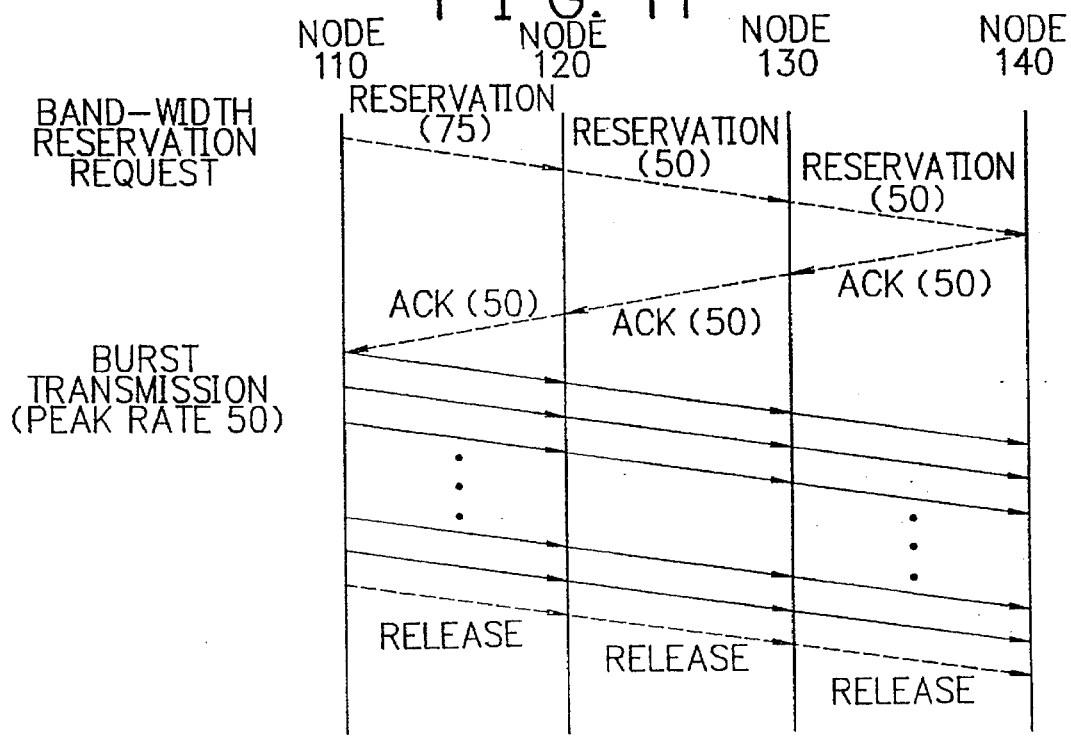

BURST BANDWIDTH RESERVATION METHOD IN ASYNCHRONOUS TRANSFER MODE (ATM) NETWORK

BACKGROUND OF THE INVENTION

The present invention relates to a method of reserving burst band-widths or band-widths in an ATM network.

DESCRIPTION OF THE RELATED ART

Heretofore, a congestion control method has been employed to detect a congestion in a network so as to prevent deterioration of the quality of network operation. For example, in "A Study on Congestion Control for Bit Rate Free ATM Network Resource Management", 1992 IEICE (Japan) Conference, SSE92-21, there has been described a technology in which an exchanger or a switching apparatus in a network detects a cell loss probability to decide a congested state of the network so as to control traffic therein according to the state of congestion. Namely, when the congestion is at a low level, the pertinent path is changed over to another path free of congestion; whereas, when the congestion is at a high level or heavy, the UPC (User Parameter Control) of each switching facility disposed at an entrance of the network is restricted to limit the traffic of the network, thereby improving the cell loss probability in the network.

In the congestion control method of the prior art, a switching device detects a cell loss probability to determine a congested state in the network. Consequently, the device is required to include means to detect the cell loss probability; moreover, there is necessitated means to decide one of the switching devices and to restrict the UPC thereof, thereby controlling the pertinent device.

Furthermore, in order to restore the cell loss probability to the original appropriate value in the network, it is required to restrict the UPC of the pertinent switching apparatus at an entry of the network. In consequence, data resultant from the UPC restriction is not returned to the pertinent terminal and the traffic through the terminal is lost at the entry point of the network.

Moreover, a conventional method of allocating band-widths for each burst has been described, for example, in the "Fast Band-width Reservation Scheme with Multi-path & Multilink Routing in ATM Networks", Suzuki et al., 1991 IEICE (JAPAN) Conference, SSE91-112. According to this technology, to allocate a band-width to each burst level, a terminal notifies, before transmitting a burst, only a maximum bandwidth (peak rate) necessary for the burst transmission to the system. If the maximum band-width can be reserved for all links on a path, the burst is transmitted; otherwise, the burst transmission is blocked or inhibited.

That is, as shown in FIG. 1, immediately before a burst transmission, the terminal reports a maximum band-width therefor. If the maximum band-width is reserved in all links of the path, the burst is transmitted. If the band-width reservation is impossible, the burst is prevented from being transmitted. In this connection, reference numerals 210, 220, 230, and 240 respectively designate nodes of the network in FIG. 1.

However, the conventional method of allocating a burst band-width is attended with a problem when the load imposed on the ATM network becomes greater. Namely, when a request is issued with a high peak rate in such a situation, the probability of blockage thereof is increased and hence throughput of the ATM network is limited.

SUMMARY OF THE INVENTION

It is therefore an object of the present invention to provide a congestion control method capable of removing the problems.

Moreover, another object of the present invention is to provide a flexible method of reserving a band-width for a burst capable of flexibly reserving a band-width according to a maximum band-width and a minimum band-width requested for reservation and a remaining band-width of each link, thereby solving the problem.

In accordance with the present invention, there is provided a burst band-width reservation method for use with an ATM network. The method includes the steps of connecting a source terminal via a plurality of nodes to a destination terminal, setting a path between an initiating node and a terminating node in a call set-up phase, reserving for each link on the path, prior to transmission of a burst from the source terminal, band-widths to send the burst therethrough, thereby transferring the the burst, releasing the reserved band-widths after the burst is completely transmitted, repeatedly conducting by the source terminal, at a failure of the band-width reservation on the path, a band-width re-reservation until band-widths are successfully reserved, and counting by the source terminal the number of successively failed attempts of the band-width reservation, thereby minimizing a request band-width at the band-width re-allocation for the burst transmission in accordance with the number of successively failed attempts.

BRIEF DESCRIPTION OF THE DRAWINGS

The objects and features of the present invention will become more apparent from the consideration of the following detailed description taken in conjunction with the accompanying drawings wherein:

FIG. 10 is a diagram useful to explain a burst-level band-width reservation in a sixth embodiment in accordance with the present invention;

FIG. 11 is a diagram useful to explain a burst-level band-width reservation in a seventh embodiment in accordance with the present invention;

DESCRIPTION OF THE PREFERRED EMBODIMENTS

Figure 1:
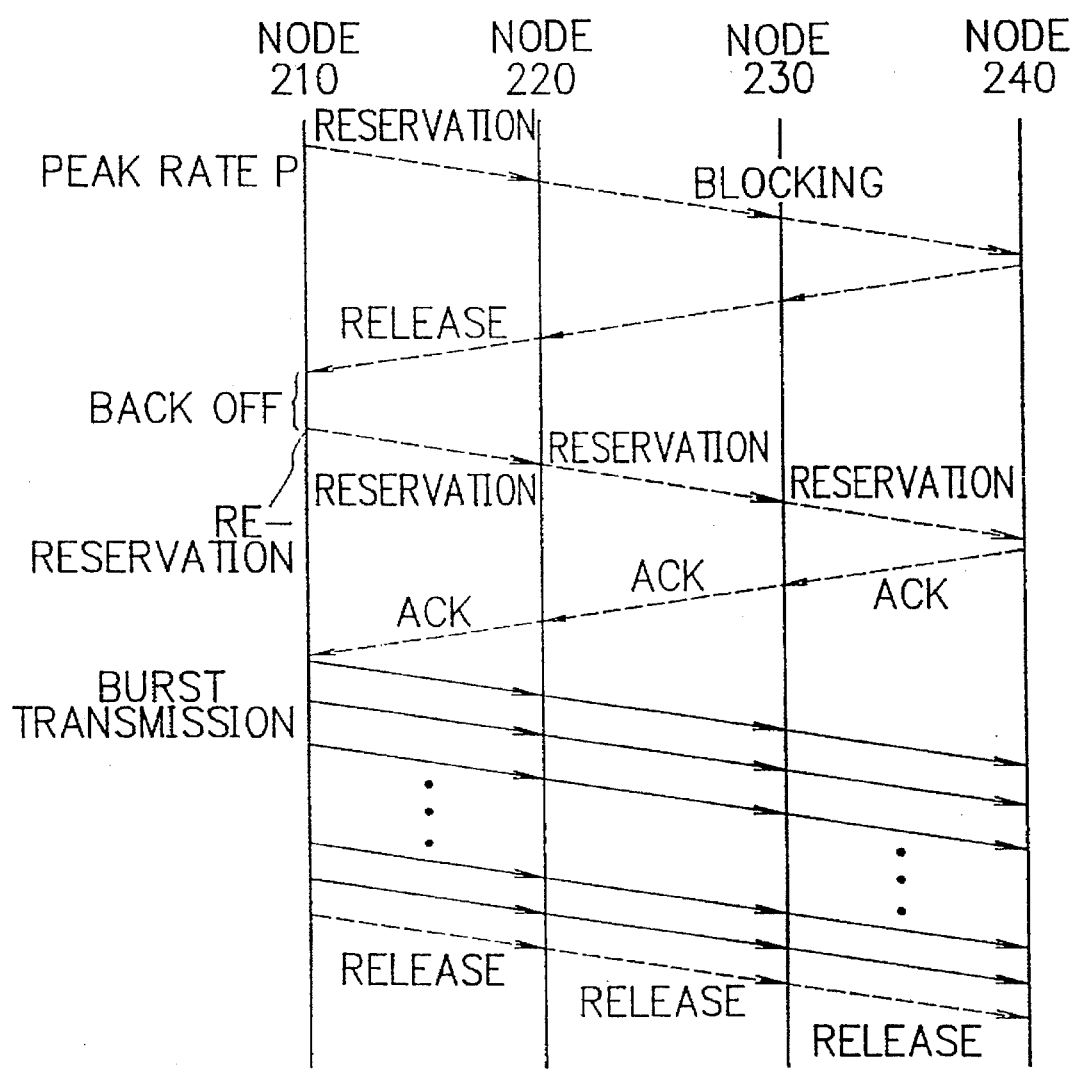
FIG. 1 is a schematic diagram showing a conventional method of reserving a band-width according to a burst level.
Figure 2:
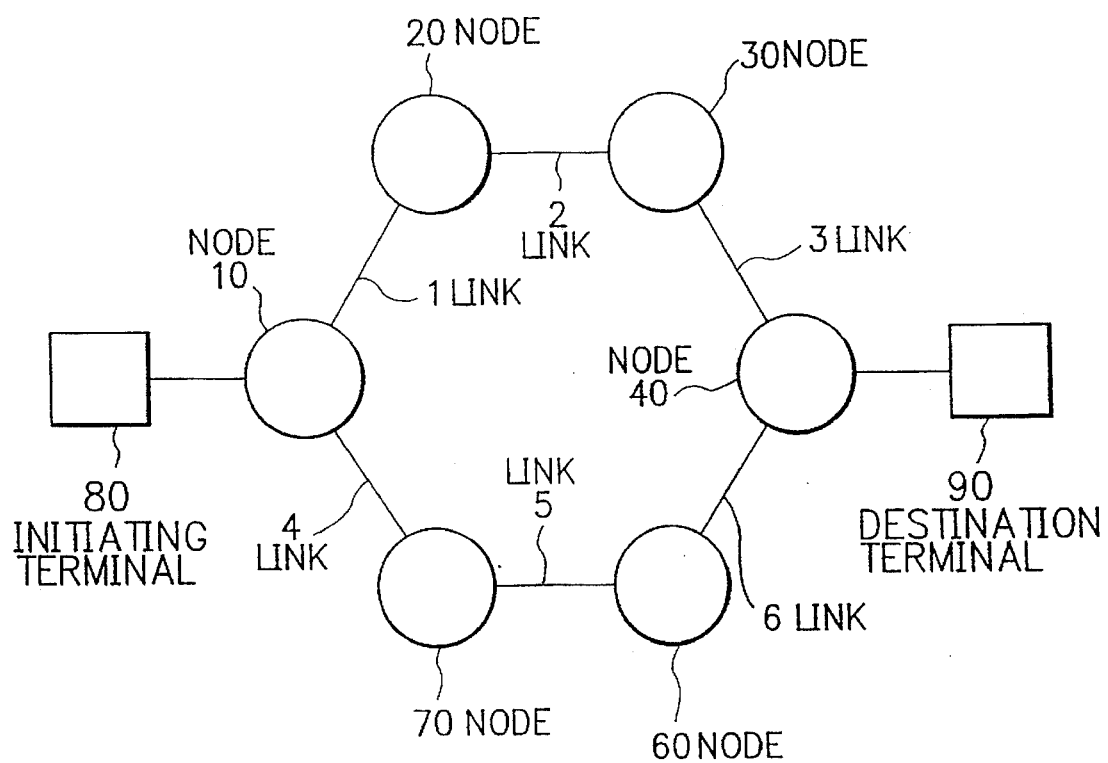
FIG. 2 is a diagram showing a network configuration to which the present invention is to be applied.

FIG. 2 shows an example of an ATM network to which the present invention is to be applied. In this diagram, there is shown a virtual channel (VC) to transfer a burst from a source terminal 80 to a destination terminal 90. Reference numerals 10 to 70 respectively denote nodes of the ATM network. Between the respective adjacent nodes 10 and 20, 20 and 30, 80 and 40, 10 and 70, 60 and 70, and 40 and 60, there are established links 1 to 6, respectively. In this regard, the virtual channel comprises a chain of nodes 10–20–30–40 (i.e., a route passing the nodes 10 to 40 in this order) and links 1, 2, and 3 therebetween.

Figure 3:
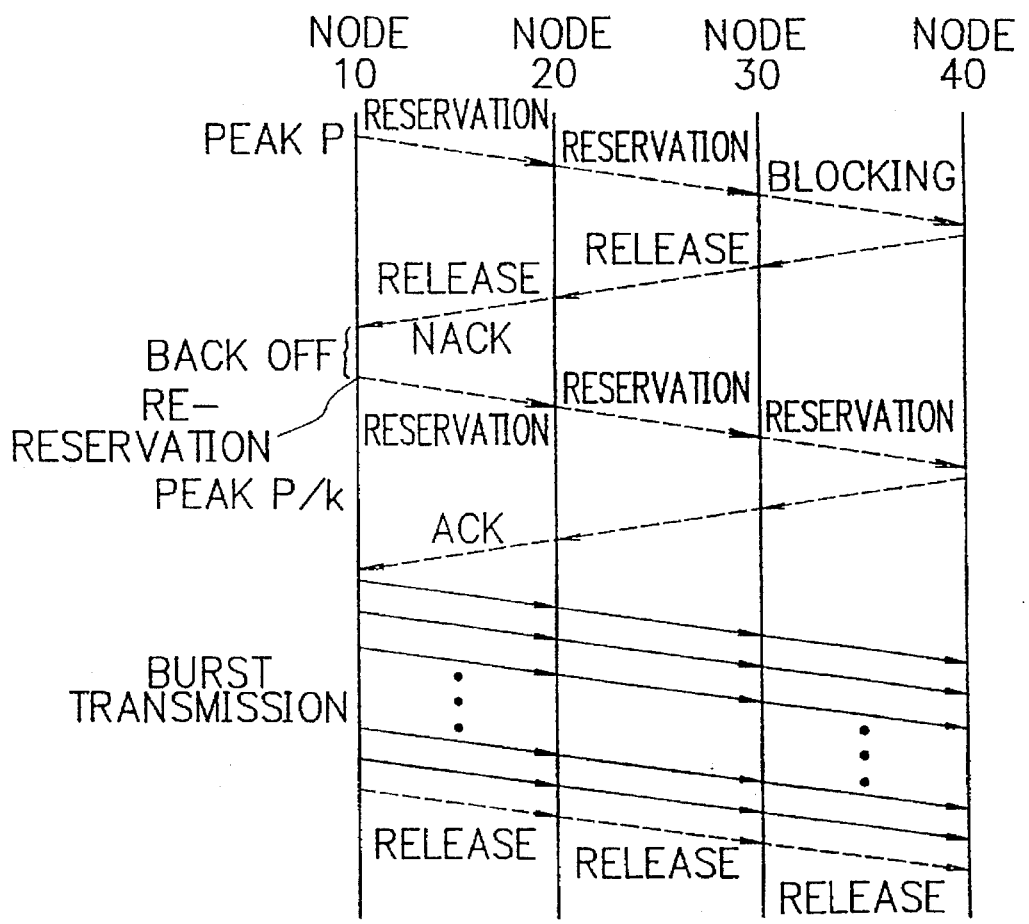
FIG. 3 is a diagram for explaining congestion control operations in a band-width reservation and a re-reservation of a band-width in a first embodiment in accordance with the present invention.

FIG. 3 shows an example of congestion control operations accomplished to reserve band-widths for each burst transmission and to reserve again band-widths in the first embodiment according to the present invention. Prior to transmission of a burst, a reservation request cell is sent from the node 10 to the node 40 to reserve a band-width. The bandwidth requested is a maximum band-width P, i.e., peak rate. When there exist only insufficient band-widths remaining in the links of the virtual channel VC; and hence the reservation is rejected, a rejection signal NACK is sent to the transmission source terminal. In addition, to prevent occurrence of a deadlock in the system, the band-width reserved on any link by a node associated therewith reserved is released. When a back-off period of time is elapsed thereafter, the source terminal 80 again sends a reservation request cell. Like operation may be repeated. In the present embodiment, however, to reduce the blockage probability of reservation, when NACK is received N times (N is a predetermined number), the terminal 80 lowers the request band-width from P to P/k, where k is an adequate denominator such as an integer 2. This operation is repeatedly accomplished until a band-width is successfully reserved. In FIG. 3, there is shown a case where N is set to one. Namely, each time when the NACK is received, the terminal 80 lowers the peak rate in proportion of P to P/k for subsequent reservation. The value of k is predetermined in the system. When the reservation is successfully completed, an acknowledge signal ACE is transmitted to the source terminal. In response thereto, the source terminal sends a burst of cells at a variable rate not exceeding the reserved band-widths to the destination terminal. After the burst transmission is successfully terminated, a cell indicating the termination is sent to release the reserved band-widths respective associated links.

Figure 4:
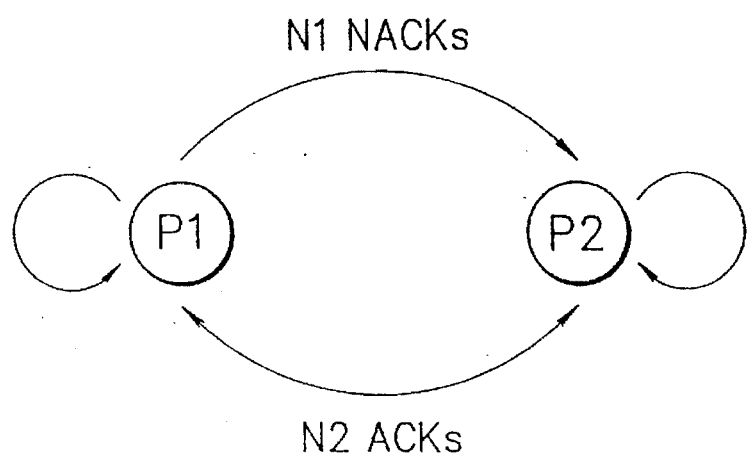
FIG. 4 is a diagram showing an example of status transition of the peak rate in a second embodiment according to the present invention.

FIG. 4 shows an example of state transition of peak rate alteration according to a second embodiment of the present invention. As shown in FIG. 4, the request peak rate takes two different values P1 and P2. N1 is the number of successive NACK's and N2, that of successive ACKS. N1 and N2 are assumed to be one and five, respectively.

Before sending a burst, to reserve a band-width, a reservation cell is transmitted from the node 10 to the node 40. The initially requested band-width is set to the maximum band-width (peak rate) P1. If the remaining band-widths are insufficient and hence the request for reservation is blocked, NACK is returned to the transmission side. Moreover, to prevent system deadlock, any reserved band-widths are released. After NACK is once received, the terminal lowers the peak rate from P1 to P2. Thereafter, the value P2 is held as the peak rate for the source terminal to issue a reservation request for the transmission burst. This also applies to the subsequent retries for reservation of band-width. When ACK is successively received five times, the peak rate is restored from P2 to P1. When NACK is received after three consecutive ACKs, the count value of ACKs is cleared to zero. Therefore, an ACK subsequent thereto is counted as the first only when ACKs are successively received five times, the peak rate is restored to P1.

Figure 5:
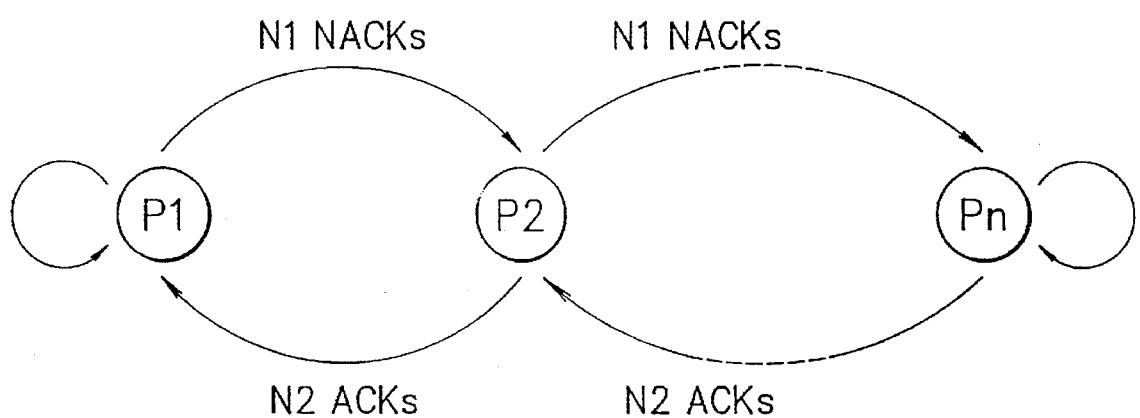
FIG. 5 is a diagram showing another example of status transition of the peak rate in a second embodiment in accordance with the present invention.

FIG. 5 shows a modification in which the peak rate takes multiple values. In this case, after the peak rate is altered from P1 to P2 in response to N1 NACK receptions, when NACKs are consecutively received N1 times again, the peak rate is changed from P2 to P3. Unless ACKs are successively received N2 times, a similar operation will be repeated until the peak rate steps down to a preset value Pn that may be the minimum peak rate for the source terminal.

In FIG. 5, letting i be an arbitrary integer such the $1<i<n$, any stepped down request peak rate Pi is varied to the next larger peak rate Pn−1 when ACKs are consecutively received N2 times, and the peak rate Pn is altered to the next smaller peak rate Pn+1 when NACKs are successively received N1 times. There may also be considered a method in which each of the values N1 and N2 is variable in accordance with the peak rate Pi. Namely, these values are determined as follows for the respective changes, for example, N1 as will be seen by comparison with FIG. 5 is set to ten for transition from P1 to P2, whereas N2 is equal to five for alteration from P2 to P3.

Figure 6:
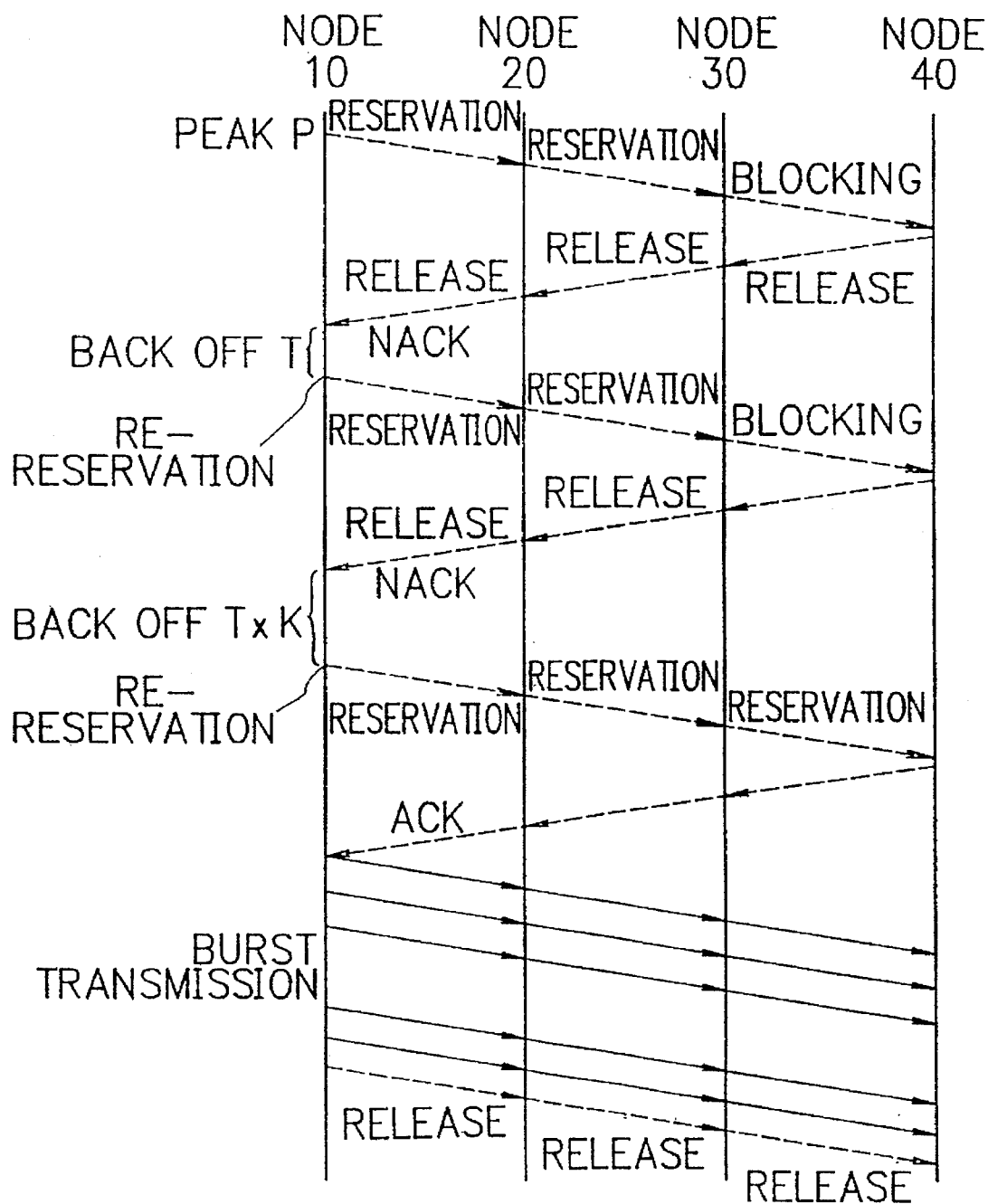
FIG. 6 is a diagram useful to explain congestion control operations in a band-width reservation and a re-reservation of a band-width in a third embodiment according to the present invention.

FIG. 6 shows an example of the congestion control operation in the band-width reservation and re-reservation for a burst transmission in a third embodiment according to the present invention. Like in the first embodiment, it is also assumed in the third embodiment that the remaining band-widths are insufficient such that the reservation is blocked and NACK is returned to the requesting side. Thereafter, when a back-off period of time T is elapsed, the requesting terminal again tries or attempts the band-width reservation. If such a trial is unsuccessfully repeated so that NACKs are received N times (N is a predetermined value), the back-off time is elongated to T×K, where K is an adequate value such as an integer 2. This operation is repetitiously accomplished until the band-width reservation is successfully completed.

In FIG. 6, there is shown a case where the value of N is set to one. Namely, when NACK is once received after a failure of the first re-reservation, the back-off time is changed to T×K (K is a predetermined value).

When the reservation is successfully terminated, ACK is transmitted to the requesting terminal. In response thereto, the terminal sends a burst to a destination terminal. After the burst is completely transmitted, a cell reporting the termination of burst transmission is sent to release the reserved band-widths.

Figure 7:
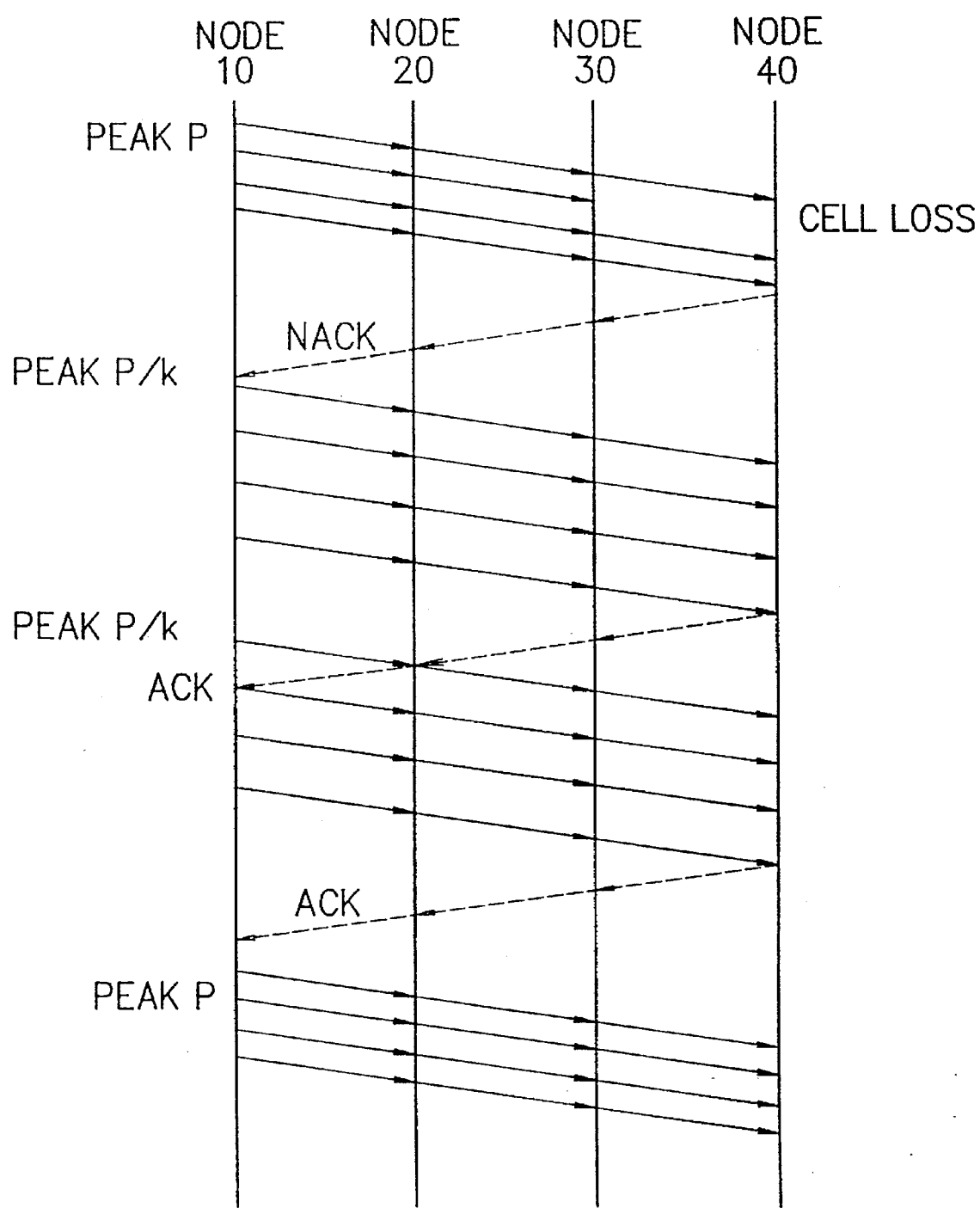
FIG. 7 is a diagram showing a congestion control operation in a fourth embodiment in accordance with the present invention.

FIG. 7 shows an example of operation to control congestion in a fourth embodiment in accordance with the present invention. According to this method of the present invention, the peak rate is altered in a manner similar to the second embodiment in a network in which the band-width reservation is not conducted for each burst, i.e. a number of bursts in any call are sequentially transmitted at predetermined intervals, in a cell mode directly after establishment of call-level VC. In the fourth embodiment, when a cell is lost during a burst transmission and hence the transmission is failed, NACK is returned to the source terminal. In contrast thereto, when there does not occur such a cell loss and hence the burst transmission is successfully achieved, ACK is sent to the terminal. When NACKs are consecutively received N1 times, an interval between transmission cells is increased to minimize the peak rate. When ACKs are successively received N2 times, the interval between cell transmissions is decreased to set a greater value as the peak rate.

FIG. 7 shows a case where the values of N1 and N2 are set to one and two, respectively. When NACK is once received, the interval between cells transmitted from the terminal is multiplied by k to decrease the peak rate to P/k. Thereafter, when ACK is received twice, the interval is again reduced, namely, the value thereof is divided by k to restore the peak rate to P.

Also in the fourth embodiment, like in the second embodiment, the peak rate may take multiple values and the values respectively of N1 and N2 may be varied for each peak rate.

In the embodiments described, each terminal includes a detection means for detecting a band-width reservation cell which means may detect the loss of a cell or packet to thereby detect the congested state of a network, whereby the terminal is permitted to control a peak rate associated with itself. Namely, the terminal can achieve a congestion control independent of operation of the network in communication with another terminal. In other words, the network is not required to have a congestion control function for this purpose.

Figure 8:
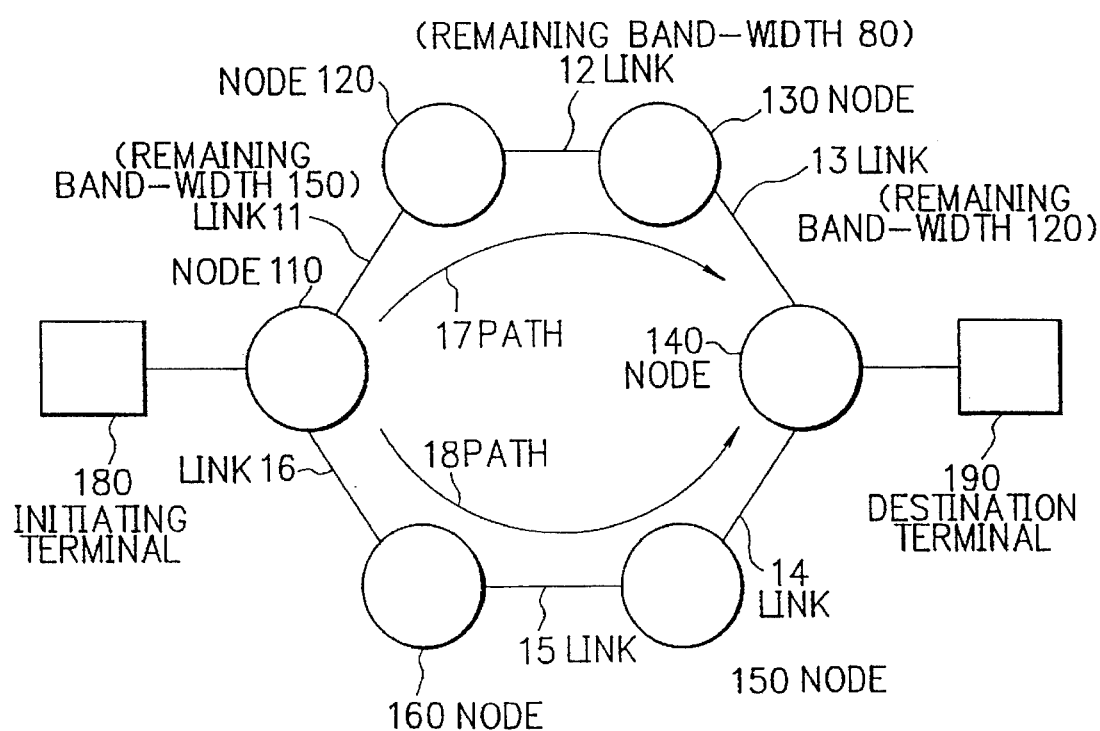
FIG. 8 is a diagram showing an ATM network to which the present invention is to be applied.

FIG. 8 shows an alternative example of an ATM network to which a burst band-width reservation method is applied in accordance with the present invention. The network includes a transmission source terminal 180, a destination terminal 190 and, a first path 17 and a second path 18 respectively established between the terminals 180 and 190. The first path 17 comprises nodes 110, 120, 130 and 140 and links 11 to 13. The second path 18 comprises nodes 110, 160, 150 and 140 links 14 to 16. Each node includes an ATM switching device, a processor for controlling transfer of cells, and the like (details of the configuration are not shown). Since each of the links 11 to 16 is in a single-link structure in this case, one virtual channel is formed in each of the paths 17 and 18. In this regard, even if each of the paths and links is configured in a multiple path or link configuration, the present invention can be similarly implemented.

Figure 9:
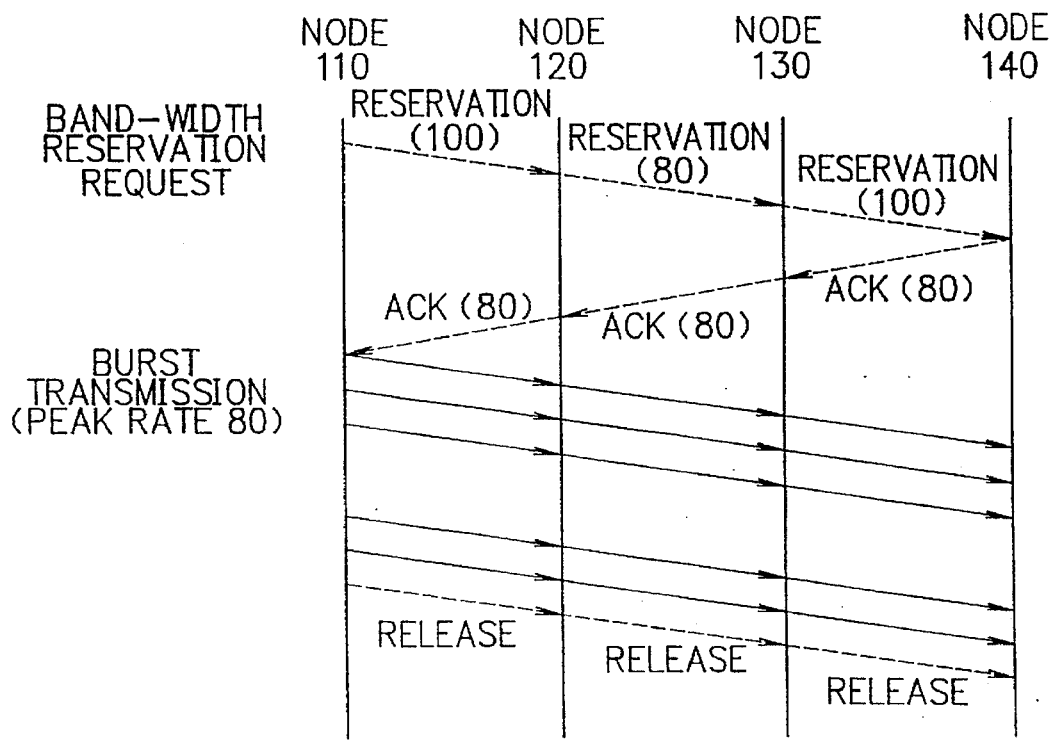
FIG. 9 is a diagram for explaining a burst-level band-width reservation in a fifth embodiment according to the present invention.

Referring now to FIGS. 8 and 9, description will be first given of operation of the band-width reservation at each burst transmission in a fifth embodiment according to the present invention. Before a burst is sent from the terminal 180, to reserve band-width for the burst transmission, a reservation cell is sent from the terminal 180 to the node 110. The cell includes information denoting the maximum band-width (peak rate) P1 and the minimum band-width P2. It is assumed that the values of P1 and P2 are set to 100 and 50, respectively. Moreover, it is assumed that the links 11 to 13 respectively controlled by the nodes 110 to 180 have remaining band-widths "150", "80", and "120", respectively. On receiving the reservation cell from the terminal 180, since the remaining band-width of the first link 11 is "150", the node 110 reserves the maximum band-width "100" for the transmission and then sends the cell to the node 120 controlling the second link 12. The remaining band-width of the node 120 is "80". Namely, this band-width is less than the maximum band-width "100" and is not less than the minimum band-width "50". Consequently, the remaining band-width "80" is reserved for the link 12 and then the cell is transmitted to the node 130. Since there is the remaining band-width equal to or more than the maximum band-width "100" for the third link 13, the node 130 reserves the maximum band-width "100" and then transmits the cell to the node 140. On receiving the cell, the node 140 recognizes according to information of the cell (indicating P1=100 and P2=50 sent from the initiating terminal 180 and the band-widths "100", "80", and "100" reserved by the respective nodes) that the band-widths have been reserved up to the last link 13. Resultantly, an ACK cell notifying the reserved minimum band-width "80" is sent via the nodes 130, 120, and 110 to the terminal 180. Receiving the ACK cell indicating the reservation of the band-width "80", the terminal 180 transmits the burst at the transmission rate "80". After the burst is completely transmitted therefrom, the terminal 180 releases the reserved band-widths.

In this connection, in a case where the remaining band-width is at most the minimum band-width "50" in either one of the links, the burst transfer is inhibited and an NACK cell is sent to the transmission source terminal 180. Furthermore, to avoid the deadlock state of the system, the band-widths already reserved for intermediate links related to the transmission are released. In this case, the terminal 180 again tries a band-width reservation when the back-off time is elapsed thereafter. Each node can control the remaining band-width of the associated link according to a table.

FIG. 10 shows an example of operation to reserve a band-width for each burst transmission in a sixth embodiment according to the present invention. Like in the embodiment of FIG. 9, the sixth embodiment is implemented in the ATM network shown in FIG. 8. Prior to a transmission of a burst, to request a band-width reservation, the source terminal 180 sends a reservation cell to the node 110. As for the requested band-width, the maximum band-width P1 is "100" and the minimum band-width P2 is "50". The remaining band-widths of the links 11 to 13 are set as "150", "80", and "120", respectively. The node 110 reserves the maximum band-width "100" for the link 11. The remaining band-width of the second link 12 is "80", which is less than the maximum band-width "100" and is not less than the minimum band-width "50". Consequently, the node 120 reserves the remaining band-width "80". The remaining band-width of the link 13 is "80" or more, which is not less than the band-width "80" reserved for the link 12. In consequence, the node 130 reserves the band-width "80" for the third link 13. The node 140 recognizes according to the cell from the node 130 that the band-width reservation is completed up to the final link, thereby sending an ACK cell notifying the reserved band-width "80" via the nodes 130, 120, and 110 to the initiating terminal 180. When relaying the ACK cell, the node 110 which has the band-width "100" reserved in excess releases the excess "20" of band-width and then updates the pertinent entry of the table such that the table indicates the reserved band-width "80". Operations thereafter are conducted in substantially the same manner as for the embodiment of FIG. 9.

FIG. 11 shows an example of operation of the band-width reservation at a burst transmission in a seventh embodiment according to the present invention. In the sixth embodiment of FIG. 10, in a case where each of the remaining band-widths is not less than the maximum band-width, the maximum band-width is reserved. However, at an arbitrary node that has a remaining band-width within a range between the maximum band-width and the minimum band-width, both inclusive, and the entire range of the remaining band-width is used to reserve a corresponding band-width, if a preceding node thereto has reserved the maximum band-width. The corresponding band-width reserved is then applied as a request band-width, i.e. an updated maximum band-width, to a subsequent node, while the minimum band-width is held as is. In the seventh embodiment, a request band-width determined at an associated node based on a function f(P1, P2, C) is reserved to save the remaining band-widths to some extent, thereby lowering the block probability of burst transmission. Also, the seventh embodiment is materialized for use with the ATM network of FIG. 8. For the links 11 to 13 of the virtual channel (VC) to transfer the burst from the initiating terminal 180 to the destination terminal 190, the remaining band-widths (C) are "150", "80", and "120", respectively. In this situation, the request band-width is calculated according to a function f(P1, P2, C) with respect to the maximum request band-width or the band-width P1 allocated by a preceding node, the minimum request band-width P2, and the remaining band-width C of the pertinent link. In this embodiment, the function f(P1, P2, C) is as follows.

$$f(P1, P2, C) = \begin{cases} P1 & C/2 > P1 \\ C/2 & P1 \geq C/2 \geq P2 \\ P2 & C/2 < P2 \\ 0 & C < P2 \end{cases}$$

Namely, for the link 11, the remaining band-width is "150" and hence P1(100)>150/2>P2 (50). In consequence, there is reserved C/2=75. For the link 12, the remaining band-width is "80" and hence 80/2<P2 (50); consequently, there is reserved P2=50. Moreover, the remaining band-width is "120" for the link 13 and the band-width reserved by the previous link is P1=50<C/2. In consequence, P1=50 is reserved for the transmission. Like in the embodiment of FIG. 10, when the band-width reservation is completed up to the last link, and ACK cell containing the reserved band-width "50" is transmitted to the source terminal 180. In the repeating operation of the ACK cell, the node 110 having excessively reserved the band-width releases the excess band-width portion "25" and then updates the table to denote the reservation band-width "50". Operations thereafter are similar to those of the embodiments above.

As above, in accordance with the embodiments, even when the maximum band-width is missing in a link, if the remaining band-width is not less than the minimum band-width, there can be allocated a band-width thereto according to the remaining band-width. This resultantly reduces the block probability of burst transmission and hence increases the network utilization efficiency.

Figure 12:
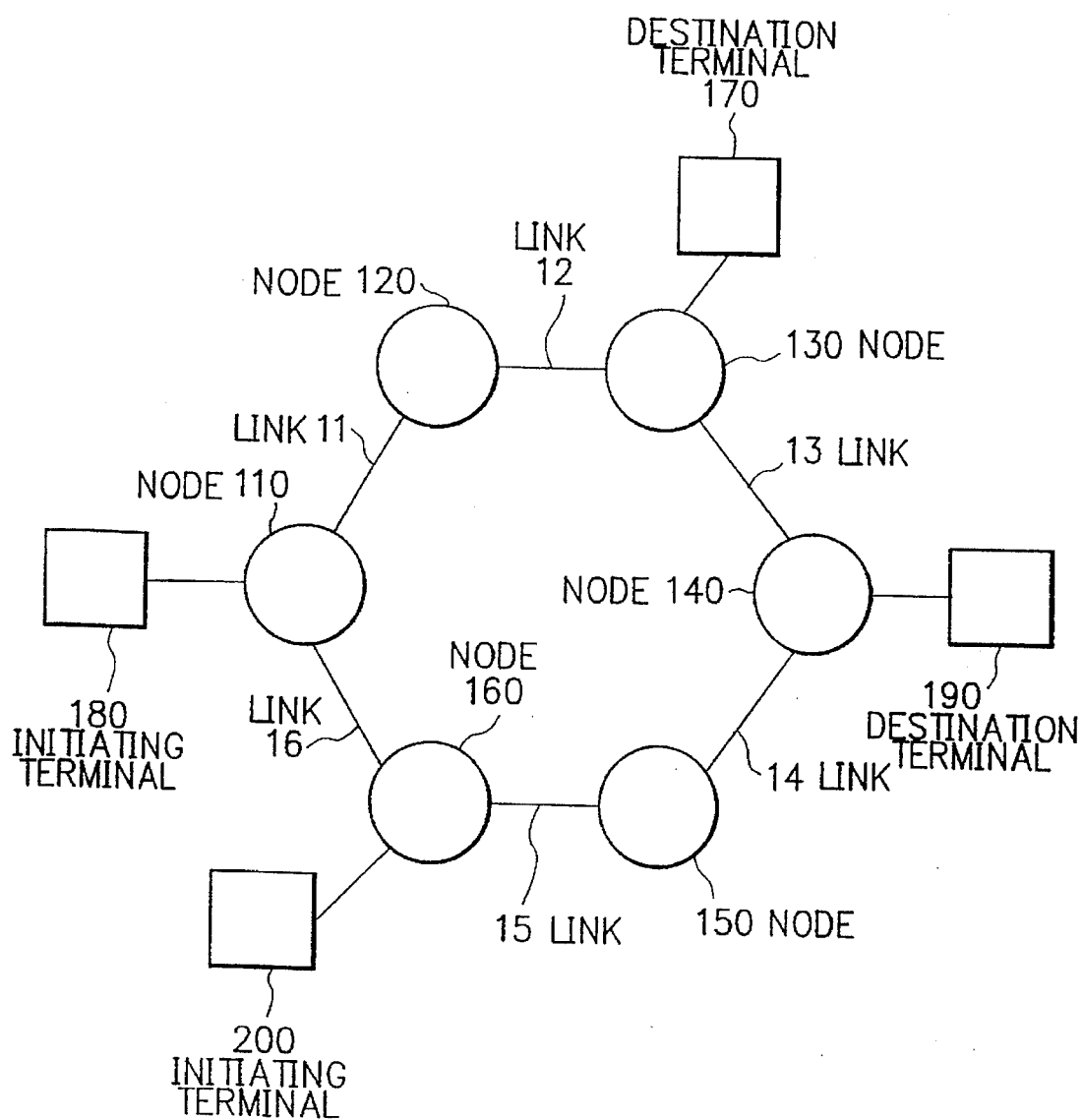
FIG. 12 is a network diagram for explaining an eighth embodiment according to the present invention.

FIG. 12 shows an illustration of the ATM network to which an eighth embodiment is applied in accordance with the present invention. The network includes ATM nodes 110 to 160. Between the adjacent nodes 110 and 120, 120 and 130, 130 and 140, 140 and 150, 150 and 160, and 110 and 160, there are formed links 11 to 16, respectively. It is assumed that each link has a link band-width capacity "150", a virtual channel (VC) to transfer a burst from a transmission source terminal 180 to a destination terminal 190 includes a chain of nodes 110–120–130–140 and links 11 to 13, and a virtual channel (VC) to transfer a burst from a initiating terminal 200 to a partner terminal 170 includes a chain of nodes 160–110–120–130 and links 16, 11, and 12.

Figure 13:
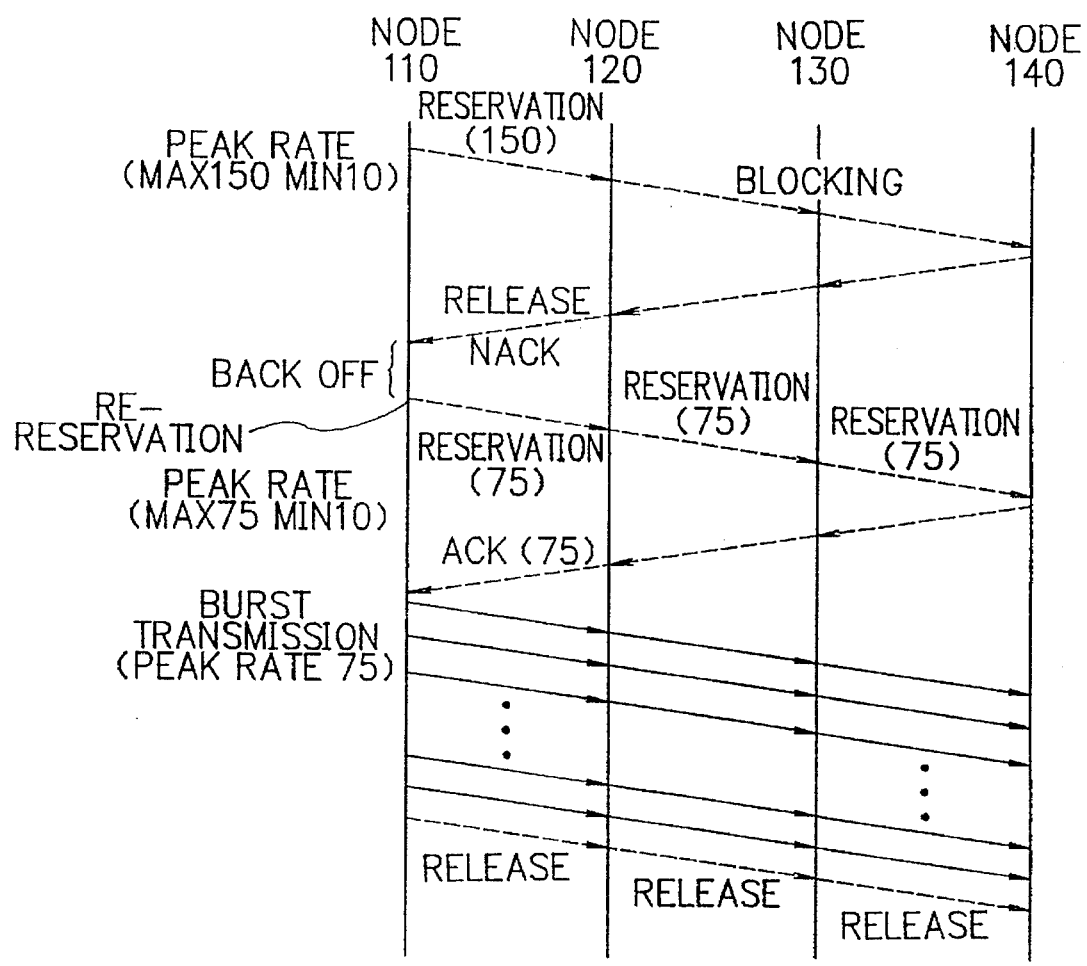
FIG. 13 is a diagram useful to explain an example of the burst-level band-width reservation in the eighth embodiment in accordance with the present invention.
Figure 14:
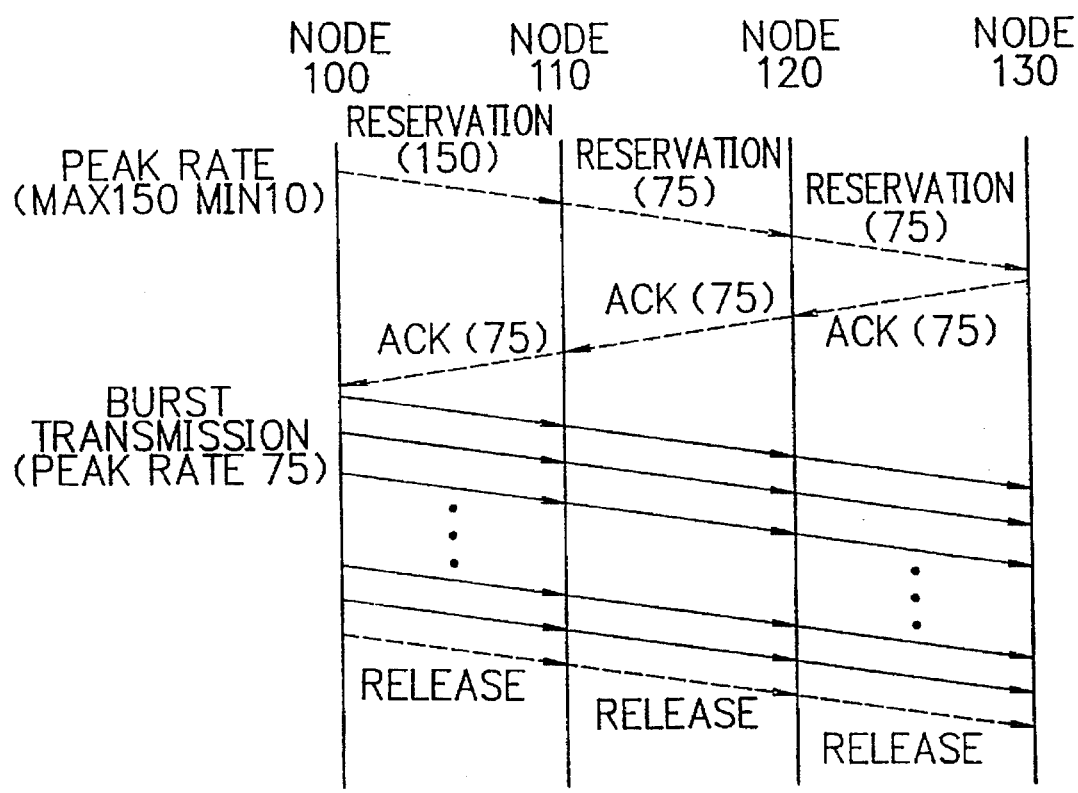
FIG. 14 is a diagram useful to explain another example of the burst-level band-width reservation in the eighth embodiment according to the present invention.

FIGS. 13 and 14 schematically show examples of a congestion control operation in a band-width reservation for a burst transmission in the eighth embodiment according to the present invention.

Before transmitting a burst from the terminal 180 to the terminal 190, to issue a request for band-width reservation, a reservation cell is sent from the node 110 to the node 140. In the reservation, it is assumed that the remaining band-widths of the links 11 to 16 are "150", "150", "0", "0", "150", and "150", respectively.

The band-width requested by the terminal 180 is between the maximum band-width (peak rate) P1 and the minimum band-width P2. It is assumed that P1 and P2 take values "150" and "10", respectively. In this case, the remaining band-width of the link 13 is "0", namely, there is missing the remaining band-width P2=10 as the minimum band-width. Consequently, the reservation is rejected and a NACK cell is sent to the transmitting terminal 180 as shown in FIG. 13. In addition, to prevent the deadlock of the system, the band-widths already reserved for intermediate links are released. When the back-off time is elapsed thereafter, the initiating terminal 180 attempts a reservation again. In the operation of the terminal 180, to decrease the block probability of the burst transmission, when an NACK cell is received N times (N is a predetermined value), the maximum request band-width is lowered to P1'. In the diagram of FIG. 13, the values of N and P1' are set to one and 75, respectively. Namely, when the transmission side receives an NACK cell once, the band-width reservation is attempted with the maximum band-width P1' and the minimum band-width P2 set to 75 and 10, respectively. In an operation of the terminal 180 to reserve band-widths again, assume that communications from other terminals using the links 13 and 14 are completed and the remaining band-width is "150" for each link. Since each of the remaining band-widths of the links is more than the maximum band-width "75", the maximum band-width "75" is reserved for each link so as to initiate the burst transmission. In this situation, the remaining band-widths of the links 11 to 16 are "75", "75", "75", "150", "150", and "150", respectively.

Assume that a band-width reservation is requested by the terminal 200 using the links 16, 11, and 12 in this state.

In a case where the reservation request is similarly issued with a maximum band-width P1 and a minimum band-width P2 set respectively to 150 and 10, since the remaining band-width of the link 16 is "150", an attempt is made to reserve the band-width "150". However, since the remaining band-width of the links 11 and 12 is "75", only the band-width "75" is reserved as shown in FIG. 14 and then an ACK cell reporting the reservation of the band-width "75" is sent to the source terminal 200. In this case, the link 16 having excessively reserved the band-width releases the excess band-width "75" and the reserved band-width is set to "75". On receiving the ACK cell, the terminal 180 initiates transmitting the burst at the peak rate "75". After the transmission is completed, a cell denoting the termination of the transmission is sent to release the reserved band-widths.

As above, the band-widths to be allocated are flexibly changed according to the remaining band-widths. This consequently lowers the block probability of the burst transmission.

In accordance with the present invention as described above, the maximum request band-width is reduced according to the number of failed attempts of band-width reservation. Moreover, even when there is missing the maximum band-width for a link, if the remaining band-width is equal to or more than the minimum band-width, there can be allocated a band-width for the transmission. Consequently, even in a network operated for an application fully using the link capacity to the maximum extent, the block probability of the burst transmission is minimized and the network utilization efficiency is improved.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A burst-level bandwidth reservation method for transmitting a burst of data cells from a source terminal to a destination terminal through an asynchronous transfer mode network, said network including a first node connected to said source terminal, a second node connected to said destination terminal, and a first link connected between said first and second nodes, said method comprising:

setting a virtual channel between said source and destination terminals through said first node, said first link and said second node;

providing said first node with first information concerning a remaining bandwidth available at said first link for transmitting said burst of data cells;

sending along said virtual channel a bandwidth reservation request cell with second information concerning a maximum bandwidth and a minimum bandwidth for transmitting said burst of data cells to said first node;

receiving said second information from said request cell at said first node;

selecting between one of (1) determining a first particular bandwidth which together with said minimum bandwidth define a first range of bandwidths for transmitting said burst of data cells and reserving said first particular bandwidth at said first link, and (2) reserving no bandwidth at said first link, said selecting being based on said first information and said second information;

generating at said first node, third information concerning said first particular bandwidth as being one of (1) available and (2) not available;

providing said request cell with said third information generated at said first node;

receiving said third information from said request cell at said second node;

generating a reservation acknowledge cell having fourth information concerning said first particular bandwidth based on said third information received at said second node;

sending along said virtual channel said reservation acknowledge cell with said fourth information; and responding to said fourth information from said reservation acknowledge cell received at said source terminal by transmitting said burst of data cells along said virtual channel within said first range of bandwidths between said first particular bandwidth and said minimum bandwidth.

2. A burst-level bandwidth reservation method according to claim 1, wherein said step of reserving said first particular bandwidth includes:

using as said first particular bandwidth one of said maximum bandwidth when said maximum bandwidth does not exceed said remaining bandwidth, and using said remaining bandwidth when said remaining bandwidth is between said maximum and minimum bandwidths;

wherein said third information includes said second information as received from said request cell at said first node.

3. A burst-level bandwidth reservation method according to claim 1, wherein said step of reserving said first particular bandwidth includes:

using as said first particular bandwidth one of said maximum bandwidth when said maximum bandwidth does not exceed said remaining bandwidth, and using said remaining bandwidth when said remaining bandwidth is between said maximum and minimum bandwidths;

wherein said third information includes information concerning said first particular bandwidth and said minimum bandwidth cooperatively defining said first range of bandwidths for transmitting said burst of data cells.

4. A burst-level bandwidth reservation method according to claim 1, wherein:

said step of selecting between determining a first particular bandwidth and receiving no bandwidth includes applying an operator f to said remaining bandwidth C, said maximum bandwidth P1 and said minimum bandwidth P2, such that said first particular bandwidth is determined as:

$f(P1, P2, C)=P1$, when $(C/2)>P1$;

$f(P1, P2, C)=C/2$, when $P1 \geq (C/2) \geq P2$; and $f(P1, P2, C)=P2$ when $(C/2)<P2$, and a zero bandwidth when reserving no bandwidth is determined as $f(P1, P2, C)=0$, when $C<P2$, and wherein said third information includes information concerning said first particular bandwidth and said minimum bandwidth cooperatively defining said first range of bandwidths for transmitting said burst of data cells.

5. A burst-level bandwidth reservation method for transmitting a burst of data cells from a source terminal to a destination terminal through an asynchronous transfer mode network, said network including a first node connected to said source terminal, a second node connected to said destination terminal, and a first link connected between said first and second nodes, said method comprising:

setting a virtual channel between said source and destination terminals through said first node, said first link and said second node;

providing said first node with first information concerning a remaining bandwidth available at said first link for transmitting said burst of data cells:

sending along said virtual channel a bandwidth reservation request cell with second information concerning a maximum bandwidth and a minimum bandwidth for transmitting said burst of data cells to said first node;

receiving said second information from said request cell at said first node;

selecting between one of (1) determining a first particular bandwidth which together with said minimum bandwidth define a first range of bandwidths for transmitting said burst of data cells and reserving said first particular bandwidth at said first link, and (2) reserving no bandwidth at said first link, said selecting being based on said first information and said second information;

generating at said first node, third information concerning said first particular bandwidth as being one of (1) available and (2) not available;

providing said request cell with said third information generated at said first node;

receiving said third information from said request cell at said second node:

generating a reservation acknowledge cell having fourth information concerning said first particular bandwidth based on said third information received at said second node;

sending along said virtual channel said reservation acknowledge cell with said fourth information; and responding to said fourth information from said reservation acknowledge cell received at said source terminal by transmitting said burst of data cells along said virtual channel within said first range of bandwidths between said first particular bandwidth and said minimum bandwidth;

wherein:

a) said network further includes a third node connected to said first link and a second link connected between said third node and said second node; and b) said method further comprises:

further setting said virtual channel through said first node, said first link, said third node, said second link and said second node;

providing said third node with fifth information concerning another remaining bandwidth available at said second link for transmitting said burst of data cells;

generating said third information to further include sixth information concerning said particular bandwidth being defined as an updated maximum bandwidth, said updated maximum bandwidth and said minimum bandwidth cooperatively defining an updated first range of bandwidths for transmitting said burst of data cells to said third node;

receiving said third information from said request cell at said third node;

selecting between one of (1) determining a second particular bandwidth within said first updated range of bandwidths which together with said minimum bandwidth define a second range of bandwidth for transmitting said burst of data cells and reserving said second particular bandwidth at said second link, and (2)reserving no bandwidth at said second link, based on said fifth information and said sixth information;

updating, at said third node, said third information in accordance with said step of selecting between determining a second particular bandwidth and reserving no bandwidth; and providing said request cell with said third information updated at said third node.

6. A burst-level bandwidth reservation method according to claim 5, wherein:

a) said third information is generated at said first node in accordance with said determining of a first particular bandwidth, and updated at said third node in accordance with said determining of a second particular bandwidth; and b) said method further comprises:

responding to said fourth information from said reservation acknowledge cell;

reading said fourth information from said reservation acknowledge cell at said first node; and responding to said fourth information read from said reservation acknowledge cell to calculate a difference between said first particular bandwidth determined at said first node and said second particular bandwidth within said second updated bandwidth range, and to cancel a bandwidth corresponding to said difference.

7. A burst-level bandwidth reservation method for transmitting a burst of data cells from a source terminal to a destination terminal through an asynchronous transfer mode network, said network including a first node connected to said source terminal, a second node connected to said destination terminal, and a first link connected between said first and second nodes, said method comprising:

setting a virtual channel between said source and destination terminals through said first node, said first link and said second node;

providing said first node with first information concerning a remaining bandwidth available at said first link for transmitting said burst of data cells;

sending along said virtual channel a bandwidth reservation request cell with second information concerning a maximum bandwidth and a minimum bandwidth for transmitting said burst of data cells to said first node;

receiving said second information from said request cell at said first node;

selecting between one of (1) determining a first particular bandwidth which together with said minimum bandwidth define a first range of bandwidths for transmitting said burst of data cells and reserving said first particular bandwidth at said first link, and (2) reserving no bandwidth at said first link, said selecting being based on said first information and said second information;

generating at said first node, third information concerning said first particular bandwidth as being one of (1) available and (2) not available;

providing said request cell with said third information generated at said first node;

receiving said third information from said request cell at said second node;

generating a reservation acknowledge cell having fourth information concerning said first particular bandwidth based on said third information received at said second node;

sending along said virtual channel said reservation acknowledge cell with said fourth information; and responding to said fourth information from said reservation acknowledge cell received at said source terminal by transmitting said burst of data cells along said virtual channel within said first range of bandwidths between said first particular bandwidth and said minimum bandwidth;

wherein:

a) bandwidths are defined in terms of a bit transmission rate in said burst of data cells so that said maximum bandwidth is defined as a peak value of said bit transmission rate;

b) said source terminal has a control parameter for controlling said peak value in said request cell output from source terminal; and c) said method further comprises:

generating a non-reservation acknowledge cell having fourth information based on said step of reserving no bandwidth;

sending along said virtual channel said non-reservation acknowledge cell to said source terminal;

receiving said non-reservation acknowledge cell at said source terminal; and varying said control parameter of said peak value in response to said fourth information in said non-reservation acknowledge cell.

8. A burst-level bandwidth reservation method for transmitting a burst of data cells at a bit transmission rate not exceeding a peak rate which is determined based on a first control parameter of a source terminal so as to decrease as said first control parameter increases, from said source terminal to a destination terminal, through an asynchronous transfer mode network including a first node connected to said source terminal, a second node connected to said destination terminal, and a first link connected between said first and second nodes, said method comprising:

setting a virtual channel between said source and destination terminals through said first node, said first link and said second node;

sending along said virtual channel a bandwidth reservation request cell with first information concerning said peak rate;

receiving said request cell at said first node;

attempting at said first node to reserve a bandwidth corresponding to said peak rate at said first link;

generating at said first node, second information concerning one of (1) completing said reserving of said bandwidth and (2) failing to reserve said bandwidth;

providing said request cell with said second information;

sending said request cell with said second information to said second node;

receiving said request cell at said second node;

sending a non-reservation acknowledge cell with said second information concerning failing to reserve said bandwidth to said source terminal in response to said failing to reserve said bandwidth;

receiving said non-reservation acknowledge cell at said source terminal; and increasing said first control parameter in response to said second information in said non-reservation acknowledge cell.

9. A burst-level bandwidth reservation method according to claim 8, wherein:

said control parameter includes a count value of consecutive non-reservation acknowledge cells received at said source terminal.

10. A burst-level bandwidth reservation method according to claim 8, wherein:

a) said peak rate increases as a second control parameter of said source terminal increases; and b) said method further comprises:

sending a reservation acknowledge cell with said second information concerning completing reservation of said bandwidth to said source terminal in response to said completing reservation of said bandwidth;

receiving said reservation acknowledge cell received at said source terminal; and increasing said second control parameter in response to said second information in said reservation acknowledge cell.

11. A burst-level bandwidth reservation method according to claim 10, wherein:

said second control parameter includes a count, value of consecutive reservation acknowledge cells received at said source terminal.

12. A burst-level bandwidth reservation method according to claim 8, further comprising:

waiting a back-off time after receiving said non-reservation acknowledge cell at said source terminal, before repeating said step of sending said bandwidth reservation request cell; and increasing said back-off time when increasing said first control parameter.

13. A burst-level bandwidth reservation method according to claim 12, further comprising:

sending a reservation acknowledge cell with said second information concerning completing reservation of said bandwidth to said source terminal in response to said completing reservation of said bandwidth;

receiving said reservation acknowledge cell at said source terminal;

increasing said second control parameter in response to said second information in said reservation acknowledge cell; and decreasing said back-off time in response to increasing said second control parameter.

14. A burst-level bandwidth reservation method according to claim 13, wherein:

said control parameter includes a count value of consecutive non-reservation acknowledge cells received at said source terminal, and said second control parameter includes a count value of consecutive reservation acknowledge cells received at said source terminal.

15. A burst-level bandwidth reservation method for transmitting a burst of data cells, from a source terminal to a destination terminal through an asynchronous transfer mode network having I nodes interconnected by J links, where $2 \leq I$ and $I \leq J$, said I nodes including a first node connected to said source terminal and a K-th node which is connected to said destination terminal, where $2 \leq K \leq I$, said method comprising:

a) forming a virtual channel between said source and destination terminals through K-1 route sections and said K-th node, wherein said K-1 route sections are ordered so that an i-th route section include:
 1) an i-th node among said I nodes and
 2) an i-th link among said I links, and wherein said i-th node is connected via said i-th link to an (i+1)th node among said I nodes, where $1 \leq i \leq (K-1)$;

b) sending to said i-th node a first data concerning a remaining bandwidth available in said i-th link for transmitting said burst of data cells;

c) sending a bandwidth reservation request cell with second data concerning a requested bandwidth range for transmitting said burst of data cells from said source terminal to said destination terminal, said requested bandwidth range being defined by a maximum bandwidth and a minimum bandwidth;

d) reading said second data from said request cell at said i-th node;

e) processing said first and second data to determine a particular bandwidth to be reserved at said i-th link;

f) reserving said particular bandwidth at said i-th link;

g) updating said maximum bandwidth in said second data with said particular bandwidth reserved at said i-th link so as to produce an updated maximum bandwidth;

h) reading said second data from said request cell at said K-th node;

i) sending a reservation acknowledge cell with said second data from said destination terminal to said source terminal when said updated maximum bandwidth is not less than said minimum-band width; and j) transmitting said burst of data cells from said source terminal to said destination terminal, within a range of bandwidths between said updated maximum bandwidth and said minimum bandwidth in response to said reservation acknowledge cell.

16. A burst transmission method for sequentially transmitting a plurality of bursts each including a number of data cells transmitted at a peak rate of data cell bits as determined at a source terminal for an arbitrary burst through an asynchronous transfer mode network including a first node connected to said source terminal, a second node connected to a destination terminal, and a link connected between said first and second nodes, said method comprising:

setting a virtual channel between said source and destination terminals through said first node, said link and said second node;

sending said number of data cells in a first arbitrary burst sequentially at said peak rate determined for said first arbitrary burst from said source terminal to said destination terminal;

detecting, at said second node, an incomplete arrival of said number of data cells in said first arbitrary burst;

sending a rejection cell representative of said incomplete arrival from said destination terminal to said source terminal in response to said incomplete arrival detected at said second node;

receiving said rejection cell at said source terminal; and determining said peak rate for a burst subsequent to said first arbitrary burst so that said peak rate for said subsequent burst is smaller than said peak rate for said first arbitrary burst in response to said rejection cell received at said source terminal.

17. A burst transmission method for sequentially transmitting a plurality of bursts each including a number of data cells transmitted at a peak rate of data cell bits as determined at a source terminal for an arbitrary burst through an asynchronous transfer mode network including a first node connected to said source terminal, a second node connected to a destination terminal, and a link connected between said first and second nodes, said method comprising:

setting a virtual channel between said source and destination terminals through said first node, said link and said second node;

sending along said virtual channel said number of data cells in a first arbitrary burst sequentially at said peak rate determined for said first arbitrary burst from said source terminal to said destination terminal;

detecting, at said second node, a complete arrival of said number of data cells in said first arbitrary burst;

sending a confirmation cell representative of said complete arrival from said destination terminal to said source terminal in response to said complete arrival detected at said second node;

receiving said confirmation cell at said source terminal; and determining said peak rate for a burst subsequent to said first arbitrary burst among said plurality of bursts so that said peak rate for said subsequent burst is larger than said peak rate for said arbitrary burst in response to said confirmation cell.

\* \* \* \* \*

UNITED STATES PATENT AND TRADEMARK OFFICE
CERTIFICATE OF CORRECTION

PATENT NO.   : 5,636,212
DATED        : June 3, 1997
INVENTOR(S)  : Chinatsu IKEDA It is certified that error(s) appears in the above-identified patent and that said Letters Patent is hereby corrected as shown below:

col. 3, line 18, delete "80" and insert --30-- col. 14, line 32, delete "I" and insert --J--.

Signed and Sealed this

Third Day of February, 1998

Attest:

BRUCE LEHMAN

Attesting Officer

Commissioner of Patents and Trademarks